United States Patent
Nelson et al.

(10) Patent No.: US 8,196,452 B2
(45) Date of Patent: Jun. 12, 2012

(54) COLLECTION OF PROCESS DATA USING IN-SITU SENSORS

(75) Inventors: Karl M. Nelson, Issaquah, WA (US); Kurtis S. Willden, Kent, WA (US); Anoshiravan Poursartip, Vancouver (CA); Malcolm D. Lane, Vancouver (CA)

(73) Assignee: The Boeing Company, Chicago, IL (US)

( * ) Notice: Subject to any disclaimer, the term of this patent is extended or adjusted under 35 U.S.C. 154(b) by 879 days.

(21) Appl. No.: 12/056,354

(22) Filed: Mar. 27, 2008

(65) Prior Publication Data

US 2009/0243128 A1  Oct. 1, 2009

(51) Int. Cl.
*G01M 3/02* (2006.01)
(52) U.S. Cl. .......................................................... 73/37
(58) Field of Classification Search ....................... 73/37
See application file for complete search history.

(56) References Cited

U.S. PATENT DOCUMENTS

| 5,507,090 | A * | 4/1996 | Shipley et al. ............... 29/621.1 |
| 5,741,975 | A * | 4/1998 | Vaughn et al. ................. 73/706 |
| 6,532,799 | B2 | 3/2003 | Zhang et al. |
| 6,558,590 | B1 * | 5/2003 | Stewart ........................ 264/40.5 |
| 2001/0044362 | A1 * | 11/2001 | Morrow ............................ 482/8 |

* cited by examiner

Primary Examiner — Hezron E Williams
Assistant Examiner — Alex Devito
(74) Attorney, Agent, or Firm — Parsons Behle & Latimer

(57) ABSTRACT

A system is provided for collecting data during vacuum molding of a composite part using a mold including an air tight, flexible membrane sealed to a tool. The system comprises a plurality of MEMS sensors coupled with the interior of the mold at different locations over the part. Each of the sensors produces signals related to a process parameter, such as pressure within the bag, that is sensed at the location of the sensor.

25 Claims, 8 Drawing Sheets

COLLECTION OF PROCESS DATA USING IN-SITU SENSORS

CROSS-REFERENCE TO RELATED APPLICATION

This application is related to U.S. patent application Ser. No. 12/041,832, filed Mar. 4, 2008, the entire contents of which are incorporated by reference herein.

TECHNICAL FIELD

This disclosure generally relates to techniques for collecting industrial process data, and deals more particularly with a system and method using in-situ sensors to collect data during composite molding and curing processes, especially those performed within an autoclave.

BACKGROUND

In one form of vacuum bag molding, prepreg sheet material is laid up on a mold tool. A flexible vacuum bag is then placed over the layup and the edges of the bag are sealed to the mold tool. The mold tool may be heated and a vacuum is drawn within the bag that results in the surrounding atmospheric pressure applying pressure to the layup. In some cases, the mold is placed in an autoclave that applies both heat and external pressure, adding to the force of the atmospheric pressure applied to the bag. It may be desirable to measure the pressure that is applied at various locations over the layup since these local pressures may have an affect on the porosity, and thus the quality of the cured composite part.

Current systems for monitoring molding pressures, particularly those where the layup is processed in an autoclave, employ one or more vacuum hoses that are connected between the autoclave shell or wall, and the vacuum bag. The hoses are connected to pressure/vacuum transducers which are located outside of the autoclave. This technique measures only vacuum bag pressure, and does not sense the hydrostatic pressure of the resin which can be important in monitoring and controlling the process. Furthermore, because the vacuum hoses are relatively bulky and expensive, only a limited number of transducers are used to monitor the process, thus limiting the amount of information that can be gathered. Moreover, the use of long hoses to connect remote transducers to the layup may affect measurements in unpredictable ways.

Accordingly, there is a need for a system for collecting vacuum and pressure data that eliminates the need for long connecting hoses by using multiple in-situ sensors located on or immediately near the vacuum bag to collect the data. Further, there is a need for a system of the type mentioned above that is highly flexible and allows measurement of at least some parameters before a part layup is loaded into the autoclave and/or after the part layup has been removed from the autoclave.

SUMMARY

The disclosed embodiments employ in-situ, MEMS-based sensors to monitor pressures and/or vacuum in vacuum bag molding processes, including those performed within an autoclave. For example, the MEMS-based sensors may be used to sense the pressure applied by an autoclave to various areas of a part layup in order to assess the areal uniformity of the applied pressure which may affect, for example and without limitation, the porosity of the finished part. The embodiments reduce or eliminate the need for long and cumbersome hoses and couplings previously required to connect remote sensors with the vacuum bag. The illustrated embodiments also provide a low cost, disposable system for sensing pressures/vacuum at multiple locations over the vacuum bag where it may be important to monitor vacuum and/or resin hydrostatic pressure.

The use of MEMS-based sensors allows measurement of vacuum or pressure at exact locations either on the tool side of the layup or on the bag side. The sensors can differentiate between resin hydrostatic pressure, vacuum levels and autoclave pressure. By sensing these multiple parameters at differing locations, the system can provide early detection of leaks and their exact location, which facilitates diagnostics.

According to one disclosed embodiment, a system is provided for collecting data during vacuum bag molding of a composite part using a mold including a flexible membrane sealed to a tool. The system comprises a plurality of pressure sensors coupled with the interior of the mold at different locations over the part, wherein each of the sensors produces signals related to the pressure applied to the part at the location of the sensor. The system may further comprise a processor located in the area of the mold for collecting and processing the sensor signals. At least certain of the sensors may be attached to the exterior side of the membrane, overlying openings in the membrane that place the interior of the mold in communication with the sensors. The sensors may include a substrate and a MEMS pressure sensor mounted on the substrate. At least one of the sensors may be mounted directly on the tool and may sense either a vacuum pressure or a fluid pressure within the mold.

According to another disclosed embodiment, apparatus is provided for vacuum bag molding a composite part layup, comprising: a mold including a mold tool and a vacuum bag wherein the vacuum bag covers the layup and is sealed to the mold tool; at least one sensor on the mold for generating a signal representing pressure applied to the part at the location of the sensor; and, means for processing the sensor signal. The mold tool may include an interior wall defining a mold cavity having a recess therein, and the sensor may be mounted within the recess in order to sense a pressure within the mold cavity in the area of the recess.

According to another embodiment, a system is provided for measuring the pressure applied to a vacuum bagged composite layup molded and cured inside an autoclave, comprising: a plurality of pressure sensors each coupled with the interior of the bag and sensing the pressure applied to the layup at the location of the sensor; and, at least one sensor inside the autoclave for sensing the pressure inside the autoclave. At least one of the sensors senses a vacuum pressure within the bag, and at least one of the sensors may sense a fluid pressure within the bag.

According to a disclosed method embodiment, measuring process parameters in a vacuum bag molding operation comprises: sensing the value of at least one parameter inside the bag at each of a plurality of locations over the bag while a vacuum is drawn in the bag; and, collecting the sensed values. The method may further comprise forming an opening in the bag at each of the locations, and attaching the plurality of sensors to the vacuum bag respectively overlying the openings, wherein sensing the values of the parameter is performed using the sensors. Collecting the sensed values may include wirelessly transmitting the sensed values to a collection site.

According to another disclosed embodiment, a method is provided for monitoring the pressure applied to a vacuum bag composite layup processed inside an autoclave, comprising:

coupling each of a plurality of pressure sensors with the interior of the bag at different sensing locations over the layup; using the sensors to generate a set of signals respectively representing the pressure applied to the layup at the sensing location; and, collecting the signals at a location within the autoclave near the layup. Coupling the sensors to the interior of the bag may include forming an opening in the bag at each of the sensing locations, and attaching one of the sensors to the bag overlying one of the openings.

Embodiments of the disclosure satisfy the need for a system for measuring pressures and/or vacuum in a vacuum bag molding operation carried out in an autoclave which eliminates the need for bulky hoses, uses low cost in-situ sensors, and allows process monitoring before the layup is placed in the autoclave, and/or after it has been removed from the autoclave.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
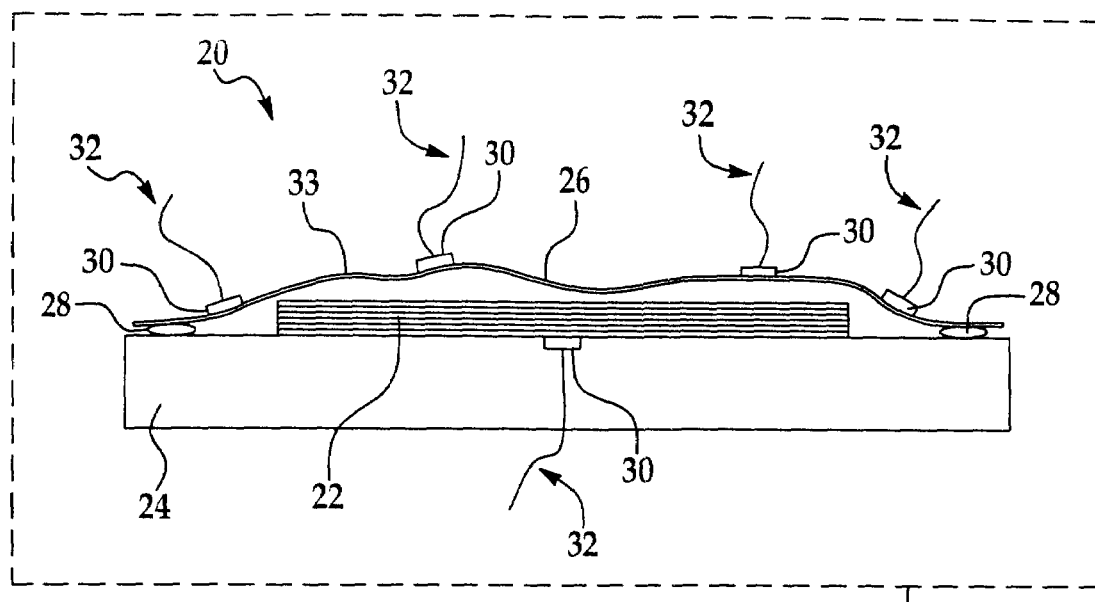
FIG. 1 is a side sectional view of a vacuum bag mold assembly having in-situ sensors for monitoring pressure/vacuum, before a vacuum is drawn in the bag.
Figure 2:
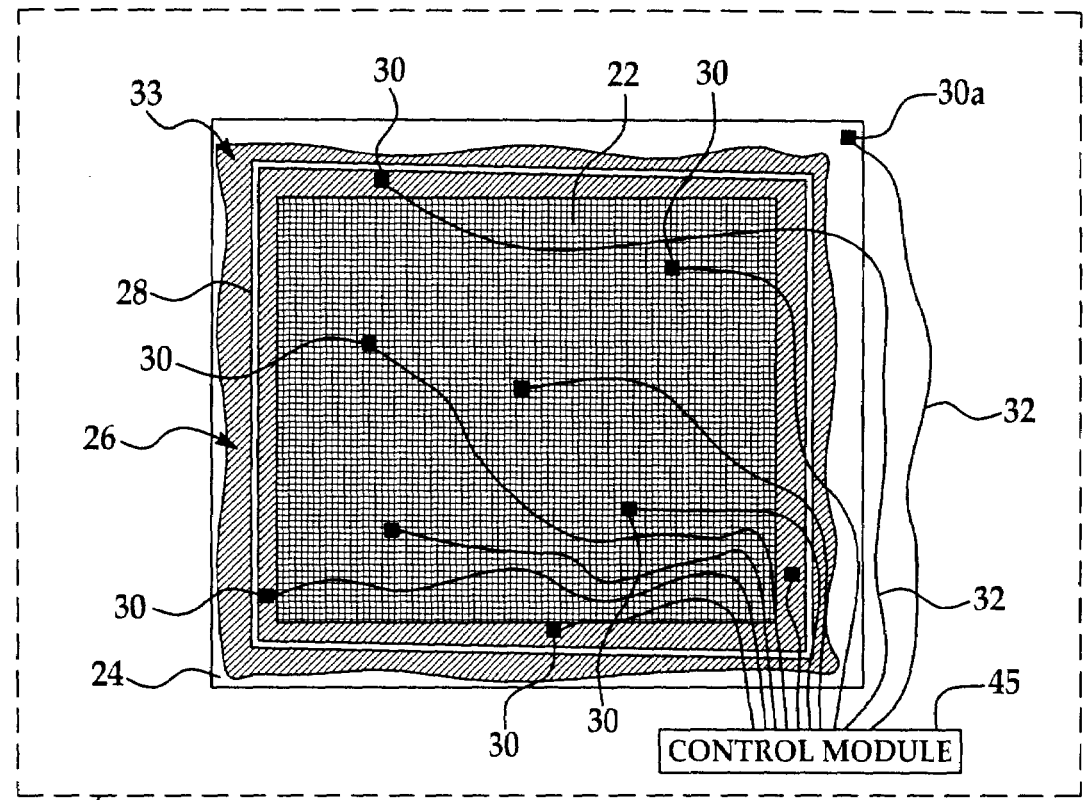
FIG. 2 is a top view of the vacuum bag molding assembly shown in FIG. 1, and also showing a control module.

Referring first to FIGS. 1 and 2, a vacuum bag mold assembly generally indicated by the numeral 20 broadly comprises a mold tool 24 used to mold a composite part layup 22 which may comprise, for example and without limitation, multiple plies of a fiber reinforced polymer resin. Pressure is applied to the layup 22 by a flexible membrane such as a vacuum bag 26 which may comprise, for example and without limitation, a flexible film such as PVA, nylon, Mylar® or polyethylene. The vacuum bag 26 is attached to the mold tool 24 by a seal 28 which typically may comprise a sticky, putty-like bag sealant that creates a substantially vacuum tight enclosure surrounding the layup 22. Although not shown in the drawings, a bleeder ply, a release film, a caul plate and a breather may be introduced between the layup 22 and the bag 26. A vacuum system and related hardware (not shown) may be coupled with the mold assembly 20 to draw a vacuum within the vacuum bag 26. Additionally, an optional resin infusion system (not shown) may be coupled with the mold assembly 20 in applications where the layup 22 comprises a dry perform requiring the infusion of resin.

In FIG. 1, the bag 26 is shown as being loosely positioned over the layup 22 before a vacuum is drawn within the bag 26. The vacuum drawn within the bag 26 results in the surrounding atmospheric pressure pressing the bag 26 against the layup 22 which reacts against the mold tool 24 to eliminate voids and force excess resin from the layup 22. The compaction pressure created by the vacuum further results in concentrating the reinforcing fibers (not shown) in the layup 22 and removing entrapped air to reduce voids and achieve substantially uniform lamination of the layup 22.

For any of various reasons, the pressure applied by the bag 26 to the layup 22 may not be uniform across the entire surface of the layup 22 contacted by the bag 26. In accordance with one disclosed embodiment, a plurality of vacuum pressure sensors 30 may be attached to exterior side 33 of the bag 26 at those locations where vacuum pressure is to be monitored. As will be discussed later in more detail, the bag 26 includes openings (not shown) at the location of the sensor 30 which places sensor 30 in communication with the interior of the bag 26.

One or more additional pressure sensors 30 may also be incorporated into the mold tool 24, beneath the layup 22 in order to sense either vacuum pressure or hydrostatic resin pressure at areas on the layup 22 other than those contacted by the bag 26. Sensors 30 generate signals representing the sensed pressures which are output on electrical lead lines 32 connected to a control module 45 located near the mold 20. It may also be possible to employ sensors 30 that incorporate miniaturized, wireless transmitters (not shown) to send the signals wirelessly to the control module 45. In the illustrated example, the mold 20 may be placed in an autoclave 25 or similar pressure vessel where the layup 26 is subjected to elevated pressure and temperature. The control module 45 may be located outside the autoclave 25, alternatively however, as will be described below, the control 25 module may be located inside the autoclave 25. The pressure applied to the layup 26 by the autoclave 25 supplements the atmospheric pressure applied to the layup 22 as a result of the vacuum within the bag 26. One or more additional pressure sensors 30a may be placed outside of the vacuum bag 26 in order to sense the pressure within the autoclave 25 that may be applied to the vacuum bag 26. In the illustrated example, a pressure sensor 30a is placed on an edge of the mold tool 24 and is connected by a lead 22 to the control module 45.

Figure 3:
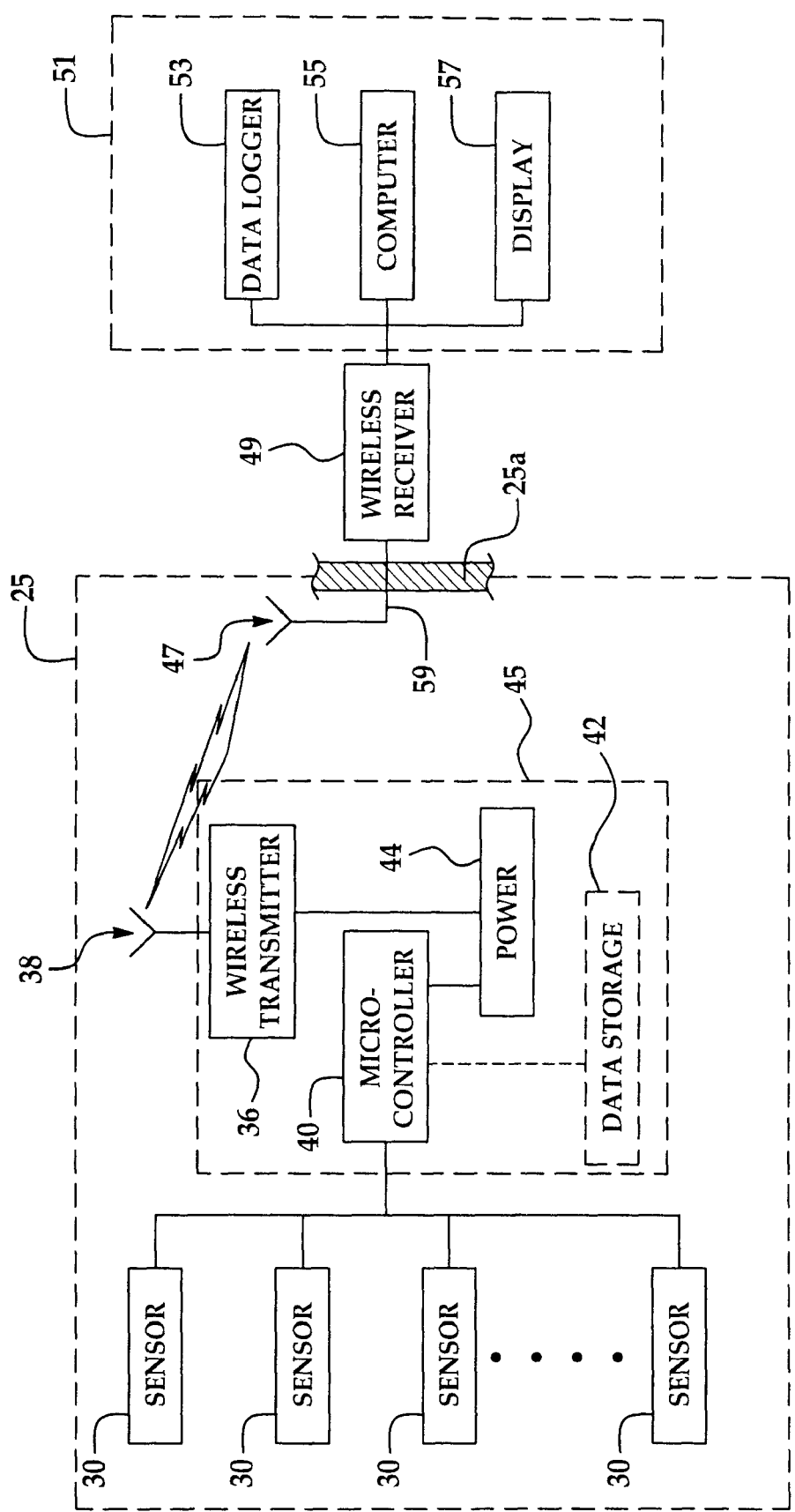
FIG. 3 is a combined block and diagrammatic view of a system for collecting and processing sensor signals.

Referring now to FIG. 3, the control module 45 may broadly include a wireless transmitter 36, a microcontroller 40 and a power source 44. The wireless transmitter 36 may comprise a conventional RF transmitter that wirelessly transmits the sensor data from the transmitting antenna 38. Other types of wireless technology may be employed such as, for example, without limitation, infrared transmission. Alternatively, the control module 45 may be located in a benign environment outside the autoclave 25 where it is connected to the sensors 30 by a wire pass-through 59 in the autoclave wall 25a.

The microcontroller 40 may comprise a commercially available processor that collects and processes the signals received from sensors 30, 30a, and manages other functions of the control module 45, such as the transmission of data by the transmitter 36. Optional data storage 42 may be provided in the control module 45 for storing the sensor data so that it may be downloaded after layup processing is complete. The power source 44 may comprise a battery, or a source of AC power that is converted to suitable DC power for operating the wireless Transmitter 36 and the microcontroller 40. The wireless transmitter 36 includes a transmitting antenna 38 that transmits sensor data signals (i.e. measurements) to a receiving antenna 47 that may be located inside the autoclave 25. A wireless receiver 49 located outside of the autoclave 25 may be connected by wiring 59 that passes through a wall 25a of the autoclave 25 and is connected to the receiving antenna 47. The wireless receiver 49 may be connected to a data collection/processing system 51 that collects and processes the transmitted sensor data. For example, the data collection/processing system 51 may include one or more of a data logger 53, computer 55 and/or a display 57 that displays the data for operator observation/use.

Although not shown in the drawings, the control module 45 may be placed in a protective container of the type more fully described in U.S. patent application Ser. No. 12/041,832 filed Mar. 4, 2008. The protective container protects the components of the control module 45 from the heat and pressure present within the autoclave 25.

Figure 4:
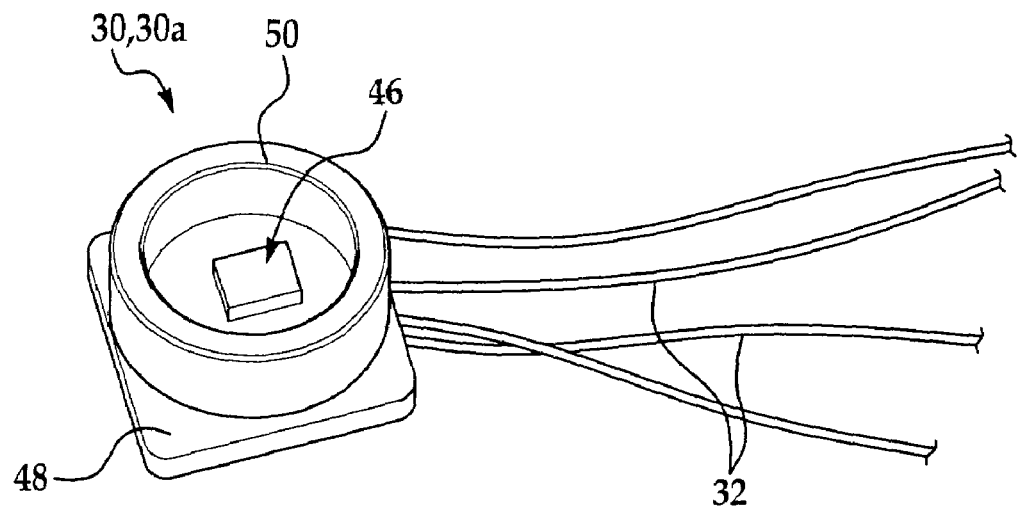
FIG. 4 is a perspective view of a MEMS pressure sensor.
Figure 5:
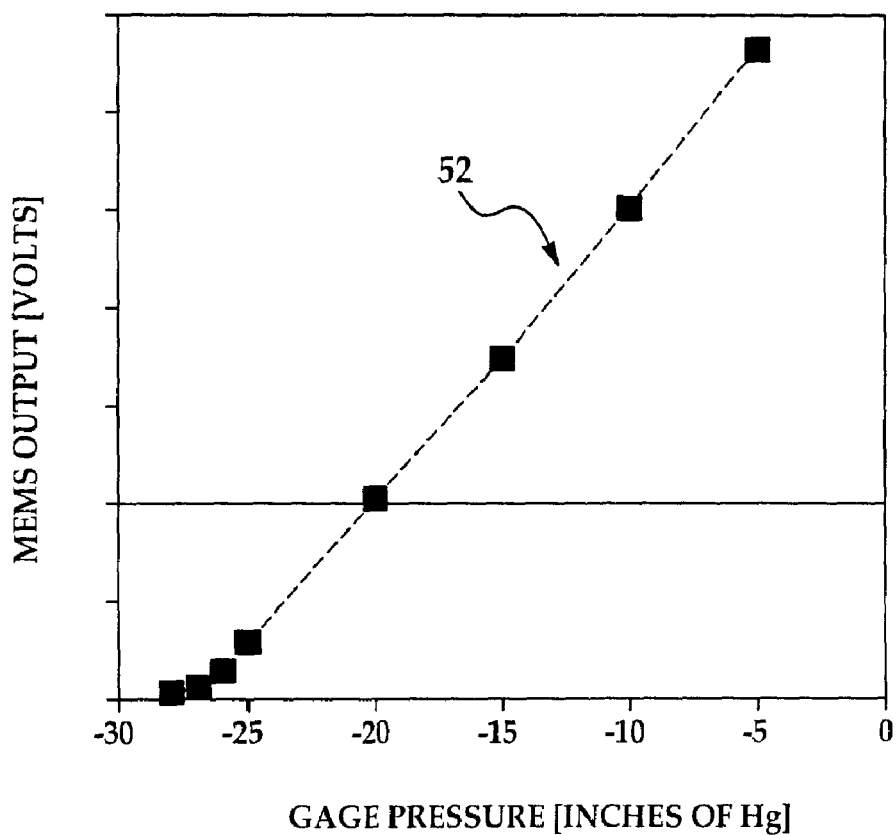
FIG. 5 is a plot showing the electrical output of the MEMs sensor shown in FIG. 4 as a function of sensed pressure.

Referring now to FIGS. 4 and 5, the sensors 30, 30a may each comprise a MEMS (micro-electromechanical system) pressure sensor device 46 as those commercially available from Intersema Sensoric SA in Bevaix, Switzerland. The MEMS device 46 described above comprises a micro-machined silicon part (not shown) and Pyrex® glass (not shown). Piezo resistances (not shown) are mounted on top of the silicon part just above a sensor membrane (not shown). The membrane may be only a few micrometers thick and deflects, depending on the pressure difference existing between its two sides. The MEMS device 46 in turn is mounted on a ceramic or other suitable type of substrate 48 to which the leads 32 are connected. A ring 50 mounted on the substrate 48 forms a protective wall around the MEMS device 46, and may be partially filled with an encapsulation (not shown) that protectively overlies the MEMS device 46. As shown in FIG. 5, the output of the MEMS device 46 indicated at 52 is a function of sensed pressure (vacuum or fluid) and is relatively linear.

Figure 6:
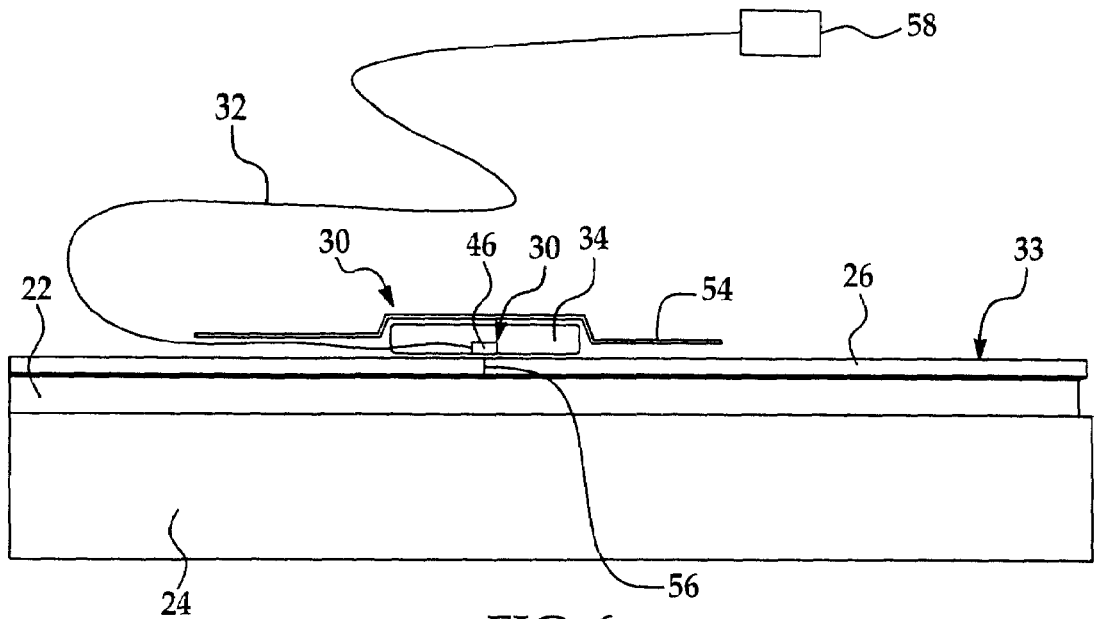
FIG. 6 is a sectional group view of a MEMS pressure sensor attached to a vacuum bag.

Attention is now directed to FIG. 6 which shows a pressure sensor 30 attached to the outer face 33 of the vacuum bag 26. A through-hole opening 56 is formed in the bag 26, as by puncturing the bag 26, at the location where the sensor 30 is to be attached. The pressure sensor 30 is positioned such that the pressure membrane (not shown) in MEMS device 46 overlies the opening 56, thus placing the MEMS device 46 in communication with the interior of the bag 26. A vacuum bag sealant tape 34 seals the sensor 30 to the bag 26, creating a vacuum-tight seals around the opening 56. A suitable adhesive tape 54 may be placed over the sensor 30 and adhered to the outer face 33 of the bag 26 in order to further hold the sensor 30 in place, and protect the relatively thin-gauge electrical leads 32. The dimensions of the tape 54 should be great enough to supplement the vacuum tight seal completely around the sensor 30. The electrical leads 32 may be stress-relieved on the bag 26 by the tape 54. The electrical leads 32 may include connectors 58 used to connect the sensors 30 with the control module 35.

Figure 7:
FIG. 7 is a sectional view showing a MEMS pressure sensor attached to a vacuum bag by a gland.

Referring to FIG. 7, the sensors 30 may be relatively bulky due to the use of the mounting substrate 48 and the ring 50. The MEMS device 46 may be incorporated (partially or fully embedded) directly into a layer 31 of breather material, which is used to convey the vacuum uniformly underneath the vacuum bag 26. The MEMS device 46 is packaged in a patch of the layer 31 of the breather material, which in turn is placed directly into the breather (not shown) covering the plies of prepreg forming the layup 22.

Figure 8:
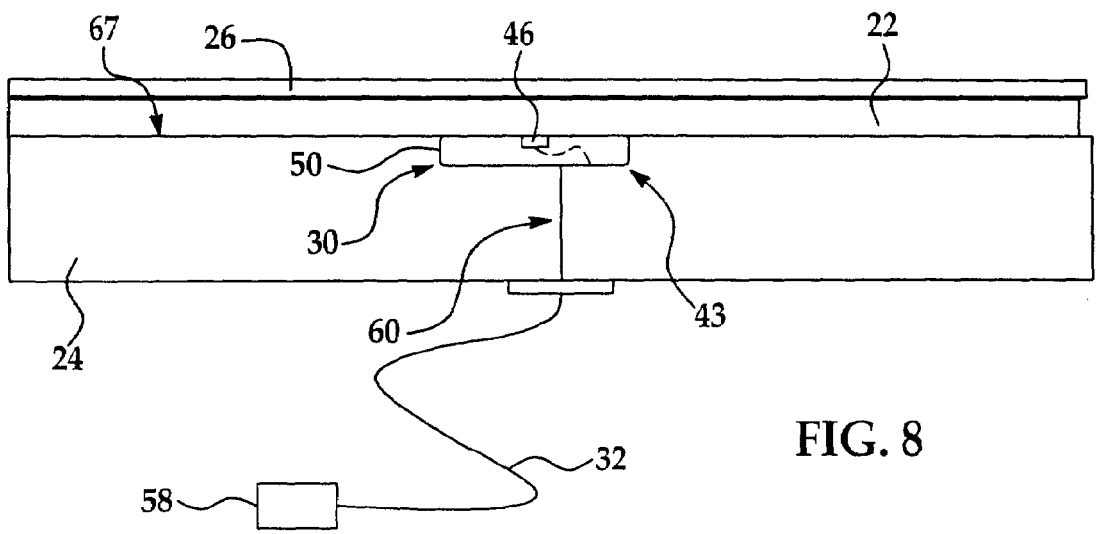
FIG. 8 is a sectional view showing a MEMs pressure sensor mounted within a recess in a mold tool.

Referring now to FIG. 8, a sensor 30 may be mounted within one or more recesses 43 formed in the interior face 67 of the mold tool 24. In contrast to the previously discussed sensors 30 attached to the bag 26 which sense pressure on the top side of the layup 22, sensor 30 senses the pressure or vacuum that exists between the layup 22 and the mold tool 24. A via 60 may be formed in the mold tool 24 in order to allow connection of an electrical lead 32 to the MEMS device 46.

Figure 9:
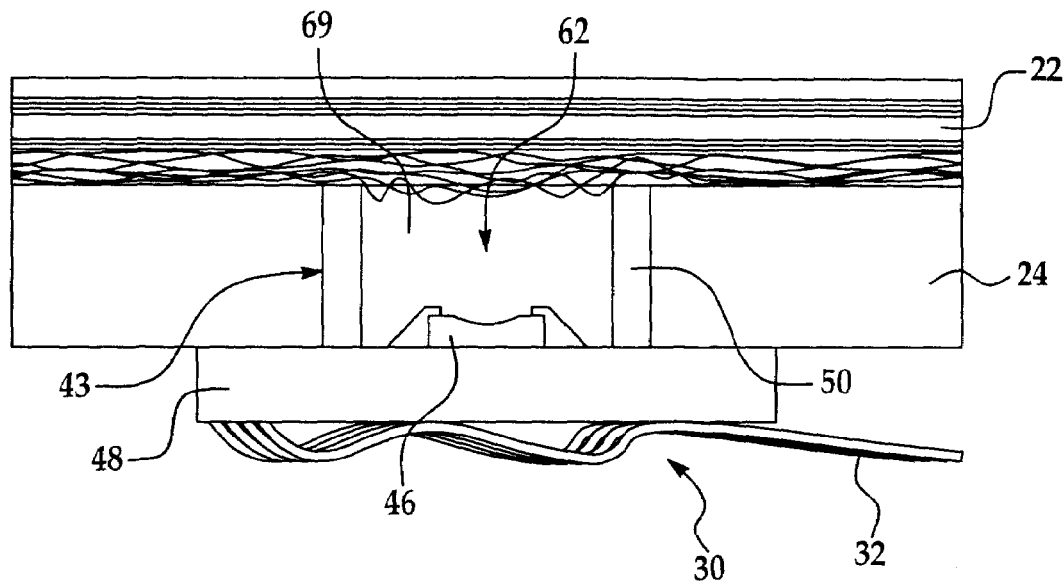
FIG. 9 is a sectional view showing a MEMS sensor used to sense hydrostatic resin pressure in a vacuum bag mold assembly.

FIG. 9 illustrates in more detail a pressure sensor 30 mounted within a recess 43 in the mold tool 24 that functions to sense the hydrostatic pressure of resin flowing through the layup 22. In this example, the ring 50 is mounted within a through hole opening 62, with the MEMS device 46 facing the layup 22. The open area 62 above the MEMS device 46 may be filled with a fluid pressure transmitting gel 69 which transfers the hydrostatic resin pressure from the layup 22 to the MEMS device 46 where it is measured. The substrate 48 may be secured to the bottom of the mold tool 24 to hold the sensor 30 in place.

Figure 10:
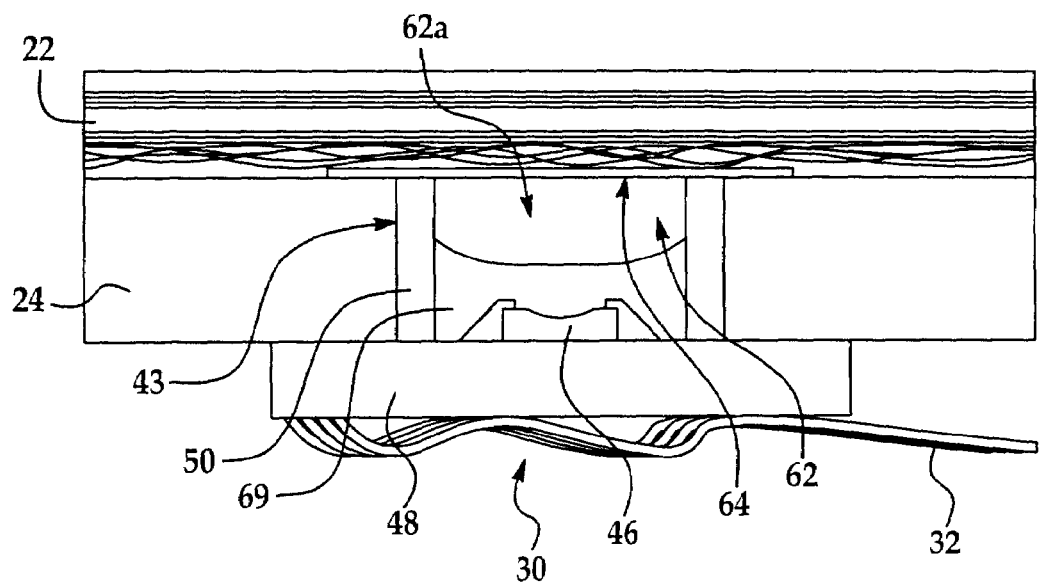
FIG. 10 is a view similar to FIG. 9 but showing a MEMS sensor used to measure vacuum pressure.

FIG. 10 is a view similar t) FIG. 9, but shows the open area 62 above the MEMS device 46 as being only partially filled with gel 69, and a thin plate 64 or porous media interposed between the end of the ring 50 and the bottom of the layup 22. The open area 62a beneath the plate 64 is subjected to vacuum pressure whose magnitude is sensed by the MEMS device 46.

Figure 11:
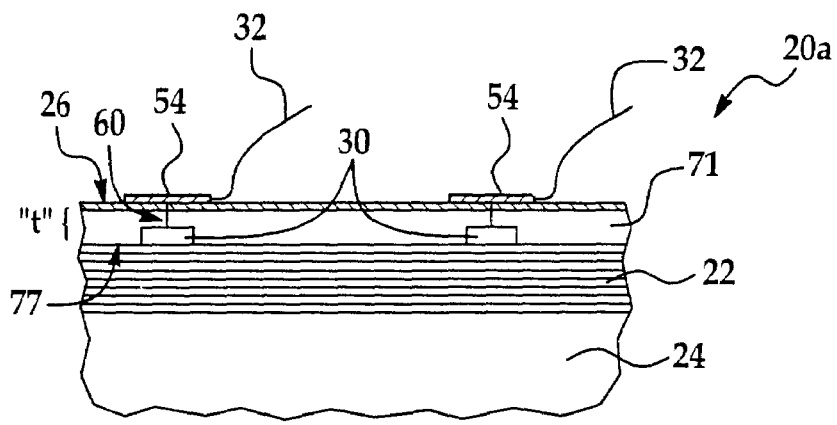
FIG. 11 is a sectional view showing MEMS pressure sensors embedded within a caul plate.

FIG. 11 illustrates a vacuum bag mold assembly 20a in which a layup 22 is compressed between a first tool 24 and a second tool in the form of a caul plate 71 that is covered by a vacuum bag 26. The caul plate 71 may be semi-flexible or rigid and has a thickness "t" greater than the thickness of the sensors 30. In this embodiment, the MEMS sensors 30 are embedded into the bottom face 77 of the caul plate 71, facing the layup 22. Sensor wires 32 pass though vias 60 in the caul plate 71 and pass-through openings (not shown) in the bag 26. Tape 54 or a similar sealing medium overlies and seals the pass-through openings in the bag 26.

Figure 12:
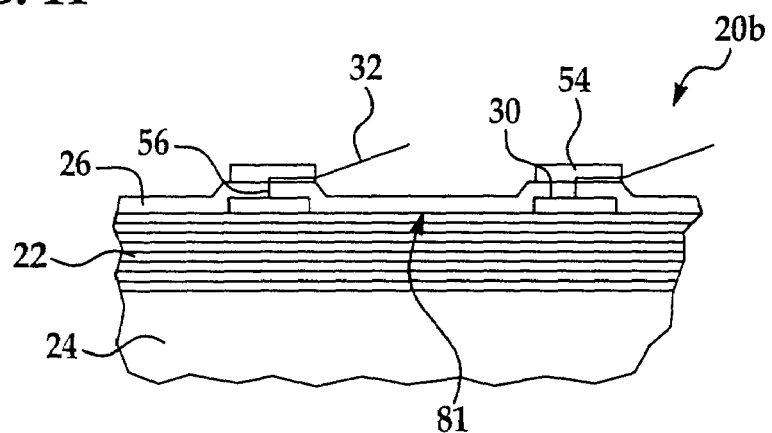
FIG. 12 is a sectional view showing MEMS pressure sensors interposed between a vacuum bag and a layup.

Another embodiment 20b of a vacuum bag mold assembly is illustrated in FIG. 12 in which the MEMS pressure sensors 30 are placed inside the bag 26, interposed between the bag 26 and the layup 22. The MEMS sensors 30 may be adhered to the inside face 81 of the bag 26, or placed on top of the layup 22 and then covered by the bag 26 during assembly of the mold assembly 20b. During the assembly process, the sensor wires 32 may be used to pierce the bag 26 in order to form wire pass-through openings 56 in the bag. Tape 54 or a similar sealing medium may be used to seal the pass-through openings 56.

Figure 13:
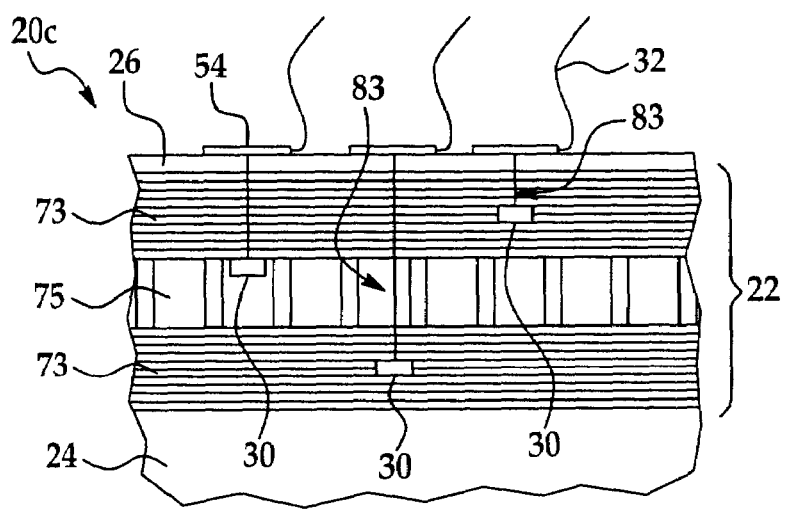
FIG. 13 is a sectional view showing MEMS pressure sensors embedded within a layup.

FIG. 13 illustrates still another embodiment 20c of a vacuum bag mold assembly in which the MEMS sensors 30 are embedded within the layup 22. Specifically, the sensors 30 may be embedded within either laminate layers 73 or a core 75, or both. In the illustrated example, the core 75 comprises a honeycomb, but the core 75 may comprise other materials such as, without limitation, a foam or other materials. Also, the sensors 30 may be embedded in any of various inserts (not shown) that may be sandwiched between the laminate layers 73. Vias 83 may be formed in the core 75 and/or laminate layers 73 to allow the sensors wires 32 to be routed to and through the bag 26. As in the previously described embodiments, tape 26 or similar means may be used to seal wire pass-through openings in the bag 26.

It should be noted here that the sensors 30 may also be mounted on or in others areas covered by or contacting the bag 26, such as without limitation, a breather (not shown), a peel ply (not shown), a seal 28 (FIG. 1), ports (not shown) and outlets (not shown).

Figure 14:
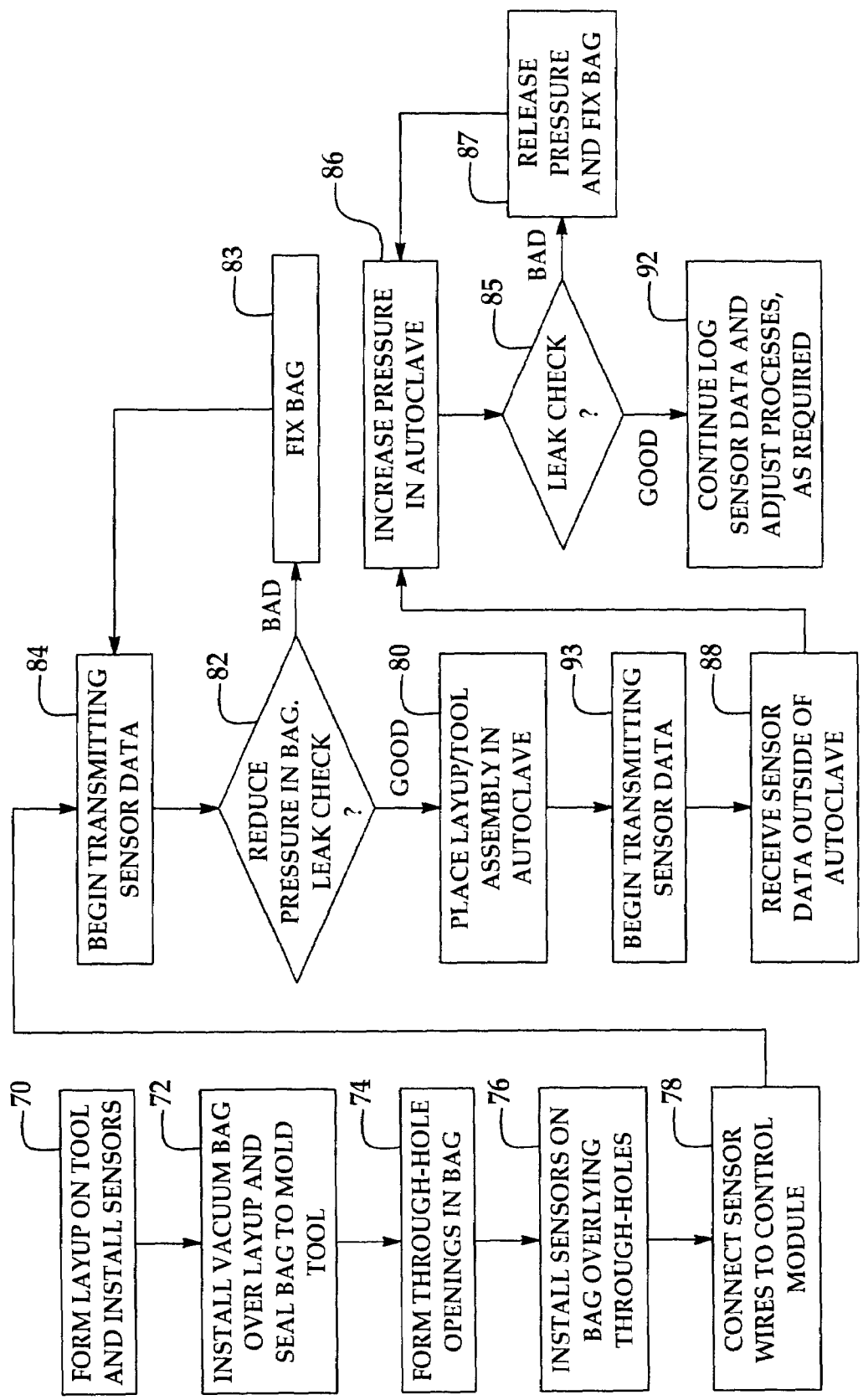
FIG. 14 is a flow diagram showing a method of sensing and collecting process data using the in-situ MEMS sensors.

Attention is now directed to FIG. 14 which shows, in simplified form, the steps of a method for measuring vacuum/pressures using the in-situ sensors 30 previously described. Beginning at 70, the layup 22 is formed on the mold tool 24. The vacuum sensors 30 may be applied at this point in the process. Then at 72, the bag 26, which may typically include a release film (not shown), a breather (not shown) and a type of caul plate (not shown), is sealed to the mold tool 24. At 74, the through openings 56 are formed in the bag 26 at the locations where it is desired to sense the vacuum pressure applied to the layup 22. As previously mentioned, the openings 56 may be formed by simply puncturing the bag 26 using a suitable tool (not shown) or the sensor wires 32. Next, at 76, the sensors 30 are installed in any of the locations previously described. At step 78, the sensor wires 32 are connected to the control module 45. At this point, the sensors 30 are functional and may be monitored if desired, as shown at 93. The vacuum integrity of the bag seal may be checked at 82 by shutting off the vacuum source and measuring how fast vacuum is lost by the bag 26. The in-situ sensors 30 facilitate this test by measuring and recording vacuum and time data, and may reveal the proximity of any leak in the bag system. If the bag fails the leak test at 82, it is repaired at 83.

At 80, the vacuum bag mold assembly 20 is placed inside the autoclave 25, following which, at 82, a vacuum is again drawn in the vacuum bag 26. The sensor data collected and processed by the microcontroller 40 may either be stored in the data storage 42, wirelessly transmitted at 84, or wired directly through the autoclave wall 25a, as described above so that the sensor data is received outside of the autoclave as indicated at 88. The sensor data may be logged at 92 and the processes are adjusted, as required. A second vacuum integrity check may then be routinely performed at 85. The vacuum sensors 30 facilitate this leak test by allowing the measurement of vacuum at a plurality of locations, thus yielding diagnostic information if any leaks are identified. If the bag 26 fails the second leak test 85, the pressure in the bag 26 is released and the bag 26 is repaired at 87. At step 86, pressure in the autoclave 25 is increased and the sensors continue to transmit data at 93.

The MEMS-based sensors 30 are relatively inexpensive and therefore can be discarded after a single use, allowing a fresh set of sensors to be used in processing each layup. Moreover, because the MEMS-based sensors 30 are both small and inexpensive, they can be deployed in large numbers where it is desirable to sense pressure at numerous locations on a relatively large layup, such as a fuselage barrel section for aircraft.

In one typical implementation of the disclosed embodiments, the MEMS sensors 30, 30a may sense vacuum from about −25 in Hg, up to a positive pressure of about 174 PSI, depending upon the particular sensor design. The MEMS-based sensors 30, 30a may be relatively small in size, measuring from, for example and without limitation, about 0.25× 0.25 inches for the overall package. The MEMS device 46 itself is considerably smaller, offering a diversity of alternate applications.

Figure 15:
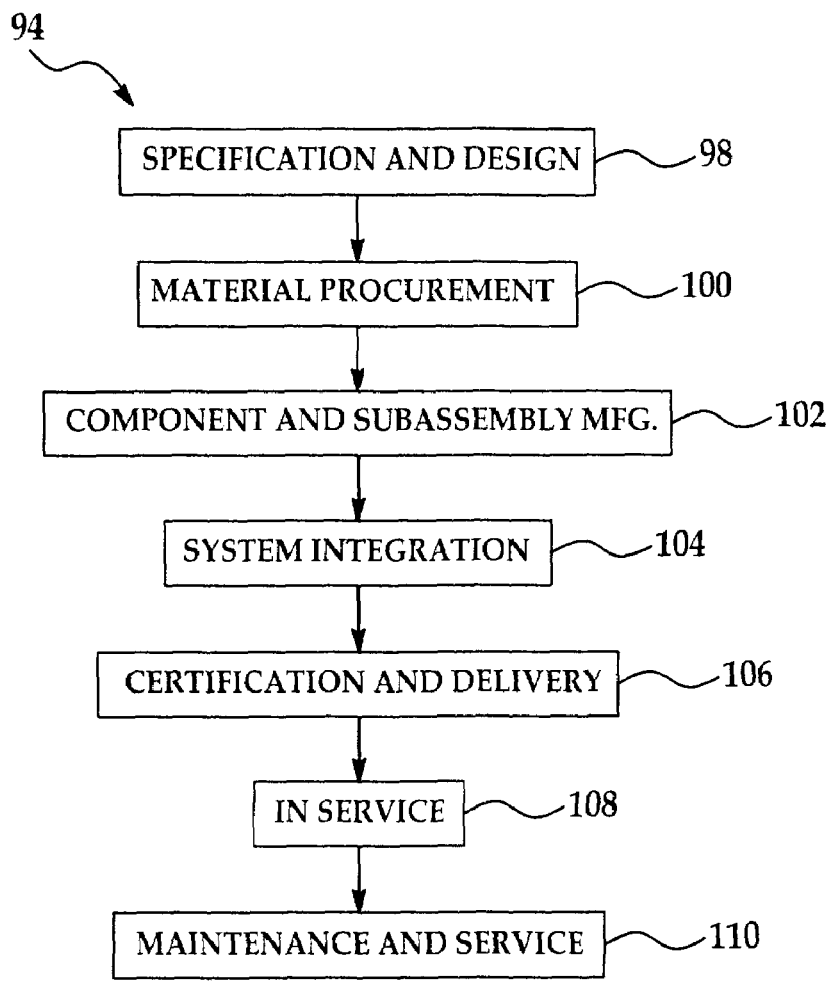
FIG. 15 is a flow diagram of aircraft production and service methodology.
Figure 16:
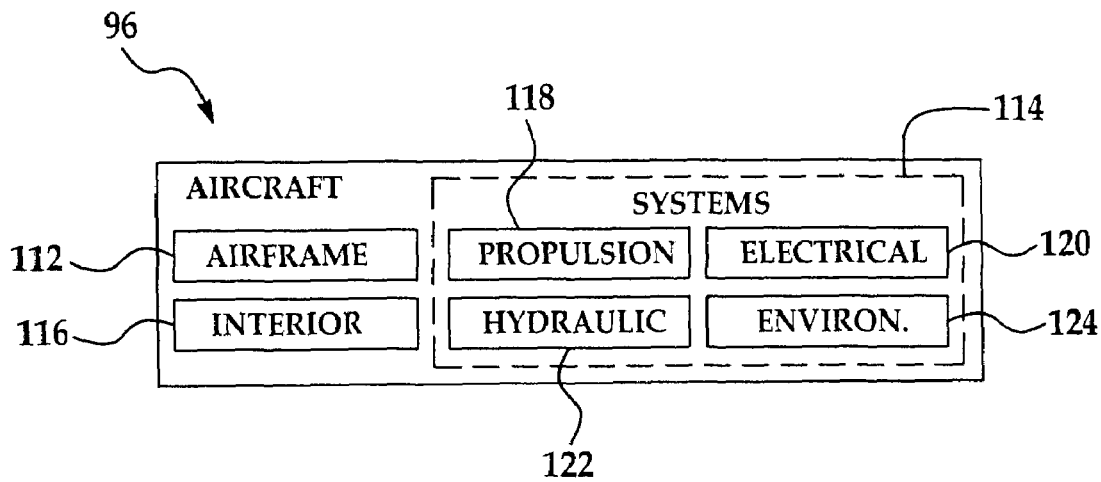
FIG. 16 is a block diagram of an aircraft.

Embodiments of the disclosure may find use in a variety of potential applications, particularly in the transportation industry, including for example, aerospace, marine and automotive applications. Thus, referring now to FIGS. 15 and 16, embodiments of the disclosure may be used in the context of an aircraft manufacturing and service method 94 as shown in FIG. 15 and an aircraft 96 as shown in FIG. 16. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 106 in order to be placed in service 108. While in service by a customer, the aircraft 96 is scheduled for routine maintenance and service 110 (which may also include modification, reconfiguration, refurbishment, and so on).

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 96 produced by exemplary method 94 may include an airframe 112 with a plurality of systems 114 and an interior 116. Examples of high-level systems 114 include one or more of a propulsion system 118, an electrical system 120, a hydraulic system 122, and an environmental system 124. Any number of other systems may be included. Although an aerospace example is shown, the principles of the disclosure may be applied to other industries, such as the marine and automotive industries.

Systems and methods embodied herein may be employed during any one or more of the stages of the production and service method 94. For example, components or subassemblies corresponding to production process 94 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance, repair of composite structure, and service 110.

Although the embodiments of this disclosure have been described with respect to certain exemplary embodiments, it is to be understood that the specific embodiments are for purposes of illustration and not limitation, as other variations will occur to those of skill in the art. For example, while the embodiments have been illustrated in connection with collecting pressure/vacuum data for a vacuum bag molding operation carried out within an autoclave, the data collection system and method may also be used to collect the data where the operation is not performed within an autoclave.

What is claimed is:

1. Apparatus for vacuum bag molding a composite part layup, comprising:
a mold including a mold tool and a vacuum bag covering the part layup; the mold tool includes a caul plate;

at least one sensor embedded in said caul plate and generating a signal representing a parameter sensed at the location of the sensor; and, means for processing the sensor signal.

2. The apparatus of claim 1 further comprising:

a plurality of additional sensors coupled with an interior of the mold at different locations over the part layup; and the means for processing includes a processor in communication with at least one of the plurality of additional sensors and the sensor embedded in the caul plate.

3. The apparatus of claim 2, wherein said processor further comprising a wireless transmitter for wirelessly transmitting sensor data.

4. The apparatus of claim 2, wherein:

the additional sensors are attached to an exterior side of the vacuum bag, and the vacuum bag includes a plurality of openings therein respectively placing the interior of the mold in communication with the additional sensors.

5. The apparatus of claim 2, wherein at least one of the plurality of additional sensors is at least partially embedded within one of:

a breather, a peel ply, a seal, a port, an outlet, and the composite part.

6. The apparatus of claim 2, wherein at least one of the plurality of additional sensors include:

a substrate, and a MEMS pressure sensing device mounted on the substrate.

7. The apparatus of claim 2, wherein at least one of the plurality of additional sensors is embedded in the tool and senses one of a vacuum pressure within the mold, and a fluid pressure within the mold.

8. The apparatus of claim 2, wherein at least one of the plurality of additional sensors is disposed inside the mold, positioned between the vacuum bag and the part layup.

9. The apparatus of claim 2, wherein at least one of the plurality of additional sensors is embedded within the part layup.

10. The apparatus of claim 2, further comprising:

an autoclave for curing the composite part layup; and a processor located inside the autoclave for collecting and processing data representing the parameters sensed by the sensor.

11. The apparatus of claim 2, wherein:

at least one of the plurality of additional sensors senses a vacuum pressure within the vacuum bag, and at least one of the plurality of additional sensors senses a fluid pressure within the vacuum bag.

12. The apparatus of claim 2, wherein:

at least one of the plurality of additional sensors is attached to an exterior side of the vacuum bag, and the vacuum bag includes a plurality of openings therein respectively placing the interior of the vacuum bag in communication with a corresponding one of the at least certain ones of the sensors.

13. The apparatus of claim 2, wherein each of the plurality of additional sensors produce signals related to a process parameter within the vacuum bag sensed at the location of the sensor.

14. The apparatus of claim 2, wherein at least one of the plurality of additional sensors further include a protective wall peripherally surrounding at least one of the plurality of additional sensors.

15. The apparatus of claim 1, wherein the mold tool includes:

an interior wall defining a mold cavity and having an opening therein, and wherein the sensor is mounted within the opening and senses a pressure within the mold cavity in the area of the opening.

16. The apparatus of claim 1, further comprising a plurality of the sensors on the mold, and wherein:

each of the sensors generates a signal representing a pressure inside the mold at the location of the sensor, at least certain of the sensors are attached to an exterior side of the vacuum bag, and the vacuum bag includes a plurality of openings therein respectively placing the interior of the vacuum bag in communication with a corresponding one of the certain sensors.

17. The apparatus of claim 1, further comprising at least one additional sensor at least partially embedded within a breather.

18. The apparatus of claim 1, further comprising at least one additional sensor at least partially embedded within a peel ply.

19. The apparatus of claim 1, further comprising at least one additional sensor at least partially embedded within a seal.

20. The apparatus of claim 1, further comprising at least one additional sensor at least partially embedded within a port.

21. The apparatus of claim 1, further comprising at least one additional sensor at least partially embedded within an outlet.

22. The apparatus of claim 1, further comprising at least one additional sensor at least partially embedded within the composite part.

23. A method of measuring processing parameters during molding and curing of a vacuum bagged composite layup processed inside an autoclave, comprising:

forming a plurality of openings at differing measurement locations in a vacuum bag;

attaching vacuum pressure sensors to the bag respectively overlying the openings;

using the vacuum pressure sensors to the bag respectively overlying the openings;

pressure applied to the layup at each of the measurement locations;

coupling a fluid sensor with the interior of the bag;

measuring a fluid pressure inside the bag;

placing an autoclave pressure sensor inside the autoclave but outside of the layup;

measuring the autoclave pressure applied to the vacuum bag using the pressure sensor; and collecting the measured vacuum pressures, the measured fluid pressure and the measured autoclave pressure at a location near the layup.

24. The method of claim 23 further comprising the step of sending out the measured vacuum pressures, the measured fluid pressure and the measured autoclave pressure by a wireless transmitter.

25. A system for molding a composite layup inside an autoclave, comprising:

a mold tool;

a vacuum bag sealed to the mold tool and having a plurality of openings therein at different sensing locations on the vacuum bag;

a plurality of first MEMS vacuum pressure sensors attached to the vacuum bag and respectively coupled through the openings to the interior of the vacuum bag;

at least one opening in the mold tool;

a second pressure sensor mounted within the opening in the mold tool for sensing either a vacuum pressure or a fluid pressure inside the mold;

a third autoclave pressure sensor located outside of the vacuum bag for sensing the pressure inside the autoclave; and, a processor inside the autoclave for collecting and processing the pressures sensed by the first, second and third sensors.

* * * * *

UNITED STATES PATENT AND TRADEMARK OFFICE
CERTIFICATE OF CORRECTION

PATENT NO. : 8,196,452 B2
APPLICATION NO. : 12/056354
DATED : June 12, 2012
INVENTOR(S) : Karl M. Nelson et al.

It is certified that error appears in the above-identified patent and that said Letters Patent is hereby corrected as shown below:

In the Claims

Col. 10, Line 41, should read
23. A method of measuring processing parameters during molding and curing of a vacuum bagged composite layup processed inside an autoclave, comprising:
    forming a plurality of openings at differing measurement locations in a vacuum bag;
    attaching vacuum pressure sensors to the bag respectively overlying the openings;
    using the vacuum pressure sensors to measure the vacuum within the bag at the measurement locations;
    pressure applied to the layup at each of the measurement locations;
    coupling a fluid sensor with the interior of the bag;
    measuring a fluid pressure inside the bag;
    placing an autoclave pressure sensor inside the autoclave but outside of the layup;
    measuring the autoclave pressure applied to the vacuum bag using the pressure sensor; and
    collecting the measured vacuum pressures, the measured fluid pressure and the measured autoclave pressure at a location near the layup.

Signed and Sealed this
Eighth Day of April, 2014

Michelle K. Lee
*Deputy Director of the United States Patent and Trademark Office*